US006364932B1

(12) United States Patent
Ji et al.

(10) Patent No.: US 6,364,932 B1
(45) Date of Patent: Apr. 2, 2002

(54) COLD GAS-DYNAMIC SPRAYING PROCESS

(75) Inventors: Wenchang Ji, Doylestown, PA (US); Arthur I. Shirley, Piscataway, NJ (US); Michael Joseph McGowan, Valley Cottage, NY (US); Daniel Arthur Morgan, Westfield, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/561,980

(22) Filed: May 2, 2000

(51) Int. Cl.[7] ................................................ B01D 46/24

(52) U.S. Cl. ..................... 95/12; 95/45; 95/96; 95/279; 95/283; 427/345; 427/377

(58) Field of Search ............................ 95/8, 12, 22, 23, 95/96, 279, 280, 283; 427/345, 377, 444

(56) References Cited

U.S. PATENT DOCUMENTS

| | | | | | |
|---|---|---|---|---|---|
| RE24,954 | E | * | 3/1961 | Church | 95/280 |
| 3,100,724 | A | | 8/1963 | Rocheville | |
| 3,772,851 | A | * | 11/1973 | Duffey | 95/12 |
| 4,865,627 | A | * | 9/1989 | Dewitz et al. | 95/12 |
| 4,867,768 | A | | 9/1989 | Wagner et al. | 55/267 |
| 5,153,028 | A | * | 10/1992 | Shutic et al. | 95/280 X |
| 5,302,414 | A | | 4/1994 | Alkhimov et al. | 427/192 |
| 5,531,798 | A | * | 7/1996 | Engstrom et al. | 95/280 X |
| 5,591,240 | A | * | 1/1997 | Ophardt et al. | 95/279 X |
| 5,730,781 | A | * | 3/1998 | Martin et al. | 95/279 X |
| 5,795,626 | A | | 8/1998 | Gabel et al. | 427/458 |
| 5,895,521 | A | * | 4/1999 | Otsuka et al. | 95/280 |
| 6,042,892 | A | | 3/2000 | Kim et al. | 427/459 |
| 6,217,633 | B1 | * | 4/2001 | Ohmi et al. | 95/8 |

FOREIGN PATENT DOCUMENTS

| | | |
|---|---|---|
| DE | 1 962 698 | 6/1971 |
| DE | 37 04 551 C1 | 5/1988 |
| EP | 0 554 886 A2 | 8/1993 |
| GB | 1 273 159 | 5/1972 |

OTHER PUBLICATIONS

Patent Abstracts of Japan, vol. 1999, No. 11, Sep. 30, 1999 & JP 11 169681 A (NGK Insulators Ltd), *abstract*.

* cited by examiner

*Primary Examiner*—Robert H. Spitzer
(74) *Attorney, Agent, or Firm*—Philip H. Von Neida; Salvatore P. Pace

(57) ABSTRACT

The present invention provides an improved cold gas-dynamic spraying process utilizing a carrier gas and small-diameter particulates whereby the particulate-laden carrier gas is directed to a ceramic filter unit where the particulates are separated out and the particulate-free carrier gas is analyzed and returned to the spraying process or to other gas purification systems.

20 Claims, 1 Drawing Sheet

COLD GAS-DYNAMIC SPRAYING PROCESS

FIELD OF THE INVENTION

The present invention provides for an improvement in a cold gas-dynamic spraying process comprising purifying the spent carrier gas used in the spraying process. More particularly, the present invention provides for the use of a ceramic filter to purify and recycle the carrier gas in a cold gas-dynamic spraying process.

BACKGROUND OF THE INVENTION

Various methods are employed to coat metallic surfaces. These methods vary as the type of coating and its purpose, be it decorative or for corrosion resistance. One process is cold gas-dynamic spray coating which involves spraying small powders at high velocities towards the substrate to be coated. On impact, the small particles which are typically metallic plastically deform on the substrate and form a metallic bond. This is a "no-heat" process and differs from competing processes such as thermal spray, plasma spray and electroplating which all require heat and/or dangerous chemicals which can limit applications.

In principle, the cold, gas-dynamic spray process relies on kinetic energy metallization (KEM) which utilizes powders having diameters of 1 to 50 microns. This is in contrast to other thermal processes where particles of 50 to 200 micron diameters are employed. These larger particles would bounce off the substrate rather than plastically deforming and forming the metallic bond.

Helium gas is typically employed as the medium to carry the particles because it has a high sonic velocity and can achieve particle speeds sufficient to achieve the metallic bonding. The process will typically operate between 150 to 300 psig and can run up to 500 psig. The helium flow rates are in the range of 150 to 200 Scfm with a powder flow rate of 5 to 15 kg/hr when the particle size is equal to 1 to 50 microns. Maximum level of solid does not exceed 20% of the helium flow rate. This results in a deposition efficiency of about 25 to 40% being the amount of powder fed into the system over the amount actually deposited.

This will result in an impure helium stream leaving the spraying chamber at temperatures between 100 and 400° C. Typically this helium is fed to a scrubber and discharged to the atmosphere. However, the present inventors have discovered a process whereby the used helium can be cleaned and recycled back for use in the spraying chamber. This results in improved efficiency and cost savings as the amount of helium employed in the process decreases.

SUMMARY OF THE INVENTION

The present invention provides for an improved cold gas-dynamic spray-coating process wherein the improvement comprises directing the used, particle-laden carrier gas to a high temperature ceramic filter. The ceramic filter will separate the exhaust carrier gas from the particles and a gas analyzer will determine the purity of the carrier gas. If the carrier gas meets requisite purity it is then recycled back to the powder reservoir mixing device and into the spraying chamber with no further treatment.

If the carrier gas is not pure enough for spraying, a multi-valve assembly will direct the carrier gas through a heat exchanger and then to a gas purification unit, such as a pressure swing adsorption or membrane system to separate the carrier gas from oxygen, nitrogen, water and other inert gases.

BRIEF DESCRIPTION OF THE DRAWING

The FIGURE is a representation of the gas dynamic spraying process and carrier gas recovery operation.

DETAILED DESCRIPTION OF THE PREFERRED EMBODIMENT

Figure 1:
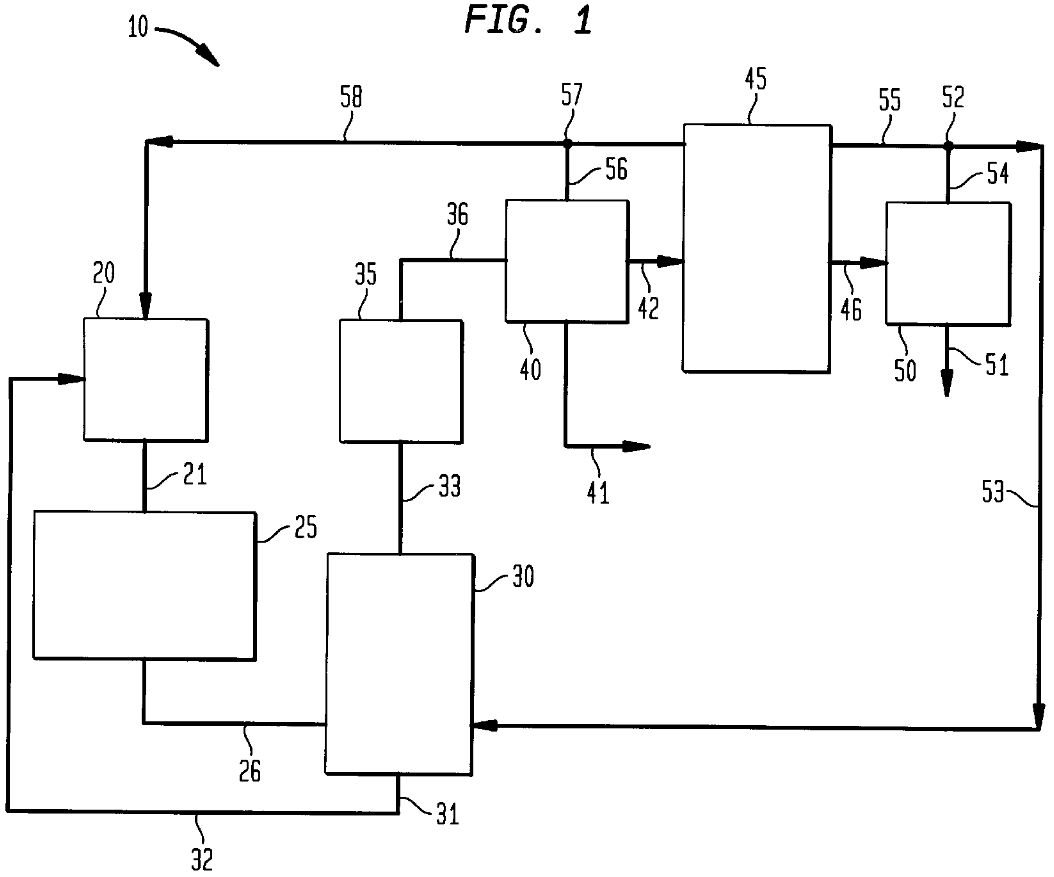

The present invention provides for an improved cold gas-dynamic spraying process comprising spraying a carrier gas containing small diameter particulates onto a substrate to coat the substrate in a spraying chamber, the improvement comprising the steps of removing the particulate-containing carrier gas from the spraying chamber; directing the gas into a ceramic filter; removing the particulate-free carrier gas and particulates from the ceramic filter; analyzing the purity of the particulate-free gas and directing the gas into a multi-valve assembly.

The particulate-free carrier gas is analyzed in a gas analyzer and directed to the multi-valve assembly. Depending upon the purity of the gas it is directed back to the spraying chamber for re-use or it is directed to a gas purification unit. The multi-valve can be actuated so that inert gases can be vented from the multi-valve while the carrier gas is directed towards either the spray chamber or the gas purification unit.

Turning now to the drawings, FIG. 1 is a representation of the gas-dynamic spraying process and carrier gas recovery operation 10. The process begins in the powder reservoir/feeder/mixing chamber 20 where the powder and the gas are mixed together. Typical metal powders include aluminum, zinc, tin, copper, nickel, titanium, iron, vanadium and cobalt. The powder gas mixture is applied to the substrate, not shown here, through a nozzle 21 into the processing chamber 25. The exhaust gas containing undeposited particles exits the chamber through line 26. Typically, the gas flow rate into the chamber is 150 to 200 Scfrn with a particle content of 5 to 15 kg/hr. The process will operate at a pressure of 150 to 300 psig. The gas leaving the spraying chamber will have a temperature of 100° to 400° C.

For purposes of the present invention, the carrier gas can comprise helium, nitrogen, argon, hydrogen, oxygen, steam, air, and mixtures thereof. Preferably, the gas is helium.

Line 26 will carry the exhaust gas/particle mixture to the high temperature ceramic filter 30. The high temperature ceramic filter is a monolith ceramic microporous membrane module such as those commercially available from Ceramem Corporation of Waltham, Mass. These membrane modules are manufactured by coating one or more membrane layers on large diameter ceramic monolith supports. The membrane coating has pore sizes ranging from about 50Å to 1.3 microns for microfiltration and ultrafiltration applications.

The monolith supports are produced in a variety of configurations by Coming, Inc. Each monolith support contains a large number of passageways or cells which extend from an inlet end face to an outlet end face. The cell structure can be round, square, or triangular and cell densities vary from 25 to 400 cells/sq. in. The porosity of the honeycomb support varies from 30 to 50% with the mean pore size ranging from about 4 to 50 microns with broad pore size distribution. The ceramic membranes can withstand operating temperatures up to 1000° C. and pressures in excess of 300 atmospheres in suitably designed pressure vessels.

For gas filtration purposes, as applied to the present invention, the membrane is operated as a dead-ended filter. The monolith structure is modified by plugging alternating cells at the upstream face of the device with high-temperature inorganic cement. Cells which are open at the upstream face of the monolith are plugged at the downstream face. The particulate laden gas is constrained to flow through the porous cell wall and is filtered on and within the cell walls of the monolith.

In operation, particulate-containing gas flows into membrane-coated passageways. The particulates are collected on the membrane surface and the filtered gas exits the module via the downstream passageways. At appropriate intervals, the filter is cleaned by backpulse operation to discharge the collected particulates. Since the ceramic filters need to be "backpurged" to unclog the pores, multiple filters may be used for continuous operation, one or more in use while the others are being regenerated. In the practice of the present invention, some of the purified gas may be diverted after the gas purification unit for use in purging the ceramic filters.

The particles removed from the gas will come to rest at the bottom of the ceramic membrane where a particle feeder 31 such as a screw mechanism or extrusion device, will return via line 32 the particles for reuse in the spraying operation. The carrier gas that is cleaned of particles will leave the ceramic membrane via line 33 to a gas analyzer 35.

The carrier gas will leave the gas analyzer through line 36 to a multi-valve assembly 40. For purposes of the present invention, "multi-valve" is meant to include both multiple way valves and multi-valves. If the gas analyzer has determined that the gas is of sufficient purity, the multi-valve is actuated to allow the gas to exit by line 56 to valve 57 and into line 58 where the gas is returned to the mixing chamber 20 for reuse in the cold gas-dynamic spraying process.

Any inert gas is vented from the multi-valve via line 41. If the carrier gas still contains impurities, either gaseous or particulate, it will leave the multi-valve through line 42 through heat exchanger 45 where the gas is cooled down. The cooler gas exits the heat exchanger through line 46 to a gas purification unit 50.

When at least one gaseous impurity is air, a preferred gas purification process is pressure swing adsorption (PSA) using a nitrogen- and oxygen-selective adsorbent. Typical adsorbents are zeolite molecular sieves and include, for example, 13X, CaX, 4A, SA, etc. The cycle of the pressure swing adsorption process generally comprises an adsorption step, an equalization-depressurization step, a counter current depressurization step, an equalization-depressurization step and a repressurization step.

When the pressure swing adsorption is performed, it is preferably carried out in an adsorption system comprising two or more adsorption vessels operated in parallel and out of phase. This arrangement is particularly useful when the feed gas to the adsorption system comprises gaseous exhaust streams withdrawn from two or more of the process chambers.

In a different embodiment of the invention, the two or more process chambers are operated out of phase and in batch mode, thereby producing the feed gas at a variable flow rate. In this embodiment, the duration of the adsorption step is preferably extended during periods when the feed gas is produced at lower flow rates and reduced during periods when the feed gas is produced at higher flow rate. Preferably, the duration of the adsorption step is adjusted in response to changes in the purity of the nonadsorbed gas product stream from the PSA system.

In another preferred embodiment, the gas purification process is carried out in an adsorption system comprising four adsorption vessels operated 90° out of phase. In this aspect, the duration of the adsorption step is preferably extended during a period when one vessel is undergoing the adsorption step, one vessel is undergoing the equalization-depressurization step, one vessel is undergoing the equalization-repressurization step and one vessel is undergoing the repressurization step. The repressurization step may comprise repressurizing the vessel with product stream produced during adsorption steps of the process, the feed gas or combinations of these.

The gases removed from the carrier gas by this process, namely, $N_2$, $O_2$ and moisture are removed from the gas purification unit by line 51 to a vent. The purified gas leaves the purification unit via line 54 to valve 52 where it can be returned through line 53 to the ceramic monolith to backpulse to clean the filters, or through line 55 to valve 57. Optionally, a heater unit (not shown) can be attached to line 55 prior to valve 57 to put some heat back into the gas prior to its return through line 58 to the gas mixing device 20.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. An improved cold gas-dynamic spraying process comprising spraying a carrier gas containing small diameter particulates onto a substrate thereby coating said substrate in a spraying chamber, the improvement comprising the steps of:

removing the particulate-containing carrier gas from said chamber;

directing said gas into a ceramic filter, thereby separating said gas from said particulates;

removing the particulate-free carrier gas and said particulates from said ceramic filter;

analyzing the purity of said particulate-free carrier gas; and directing said particulate-free carrier gas into a multi-valve assembly.

2. The process as claimed in claim 1 wherein said particulates are returned to said spraying chamber.

3. The process as claimed in claim 1 wherein said particulate-free carrier gas has oxygen, nitrogen and water present therein.

4. The process as claimed in claim 3 wherein said multi-valve is actuated according to the purity of said particulate-free carrier gas.

5. The process as claimed in claim 4 wherein said particulate-free carrier gas is directed from said multi-valve to said spraying chamber.

6. The process as claimed in claim 5 comprising actuating said multi-valve to vent other gases from said particulate-free carrier gas.

7. The process as claimed in claim 5 wherein said particulate-free carrier gas is returned to said spraying chamber.

8. The process as claimed in claim 7 wherein said purified, particle-free carrier gas is heated prior to returning to said spraying chamber.

9. The process as claimed in claim 4 wherein said particulate-free carrier gas is directed from said multi-valve to a purification unit.

10. The process as claimed in claim 9 further comprising a heat exchanger between said multi-valve and said purification unit.

11. The process as claimed in claim 9 wherein said purification unit is a pressure swing adsorption unit.

12. The process as claimed in claim 11 wherein said pressure swing adsorption unit contains adsorbents selected from the group consisting of 13X, CaX, 4A and 5A zeolites.

13. The process as claimed in claim 11 wherein said pressure swing adsorption unit comprises two or more adsorption vessels which are operated in parallel and out of phase.

14. The process as claimed in claim 11 wherein said pressure swing adsorption unit comprises two or more adsorption vessels which are operated out of phase and in batch mode.

15. The process as claimed in claim wherein said pressure swing adsorption unit comprises four adsorption vessels which are operated 90° out of phase.

16. The process as claimed in claim 1 wherein said ceramic filter is a monolith ceramic microporous membrane module.

17. The process as claimed in claim 16 wherein said monolith ceramic microporous membrane module has a membrane coating.

18. The process as claimed in claim 17 wherein said membrane coating has pore sizes from about 50 angstroms to 1.3 microns.

19. The process as claimed in claim 16 wherein said ceramic filter is exposed to temperatures up to 1000° C. and pressures up to 300 atmospheres.

20. The process as claimed in claim 1 wherein said carrier gas is selected from the group consisting of helium, nitrogen, argon, hydrogen, oxygen, steam, air, and mixtures thereof.

* * * * *